Dec. 29, 1964  R. R. HEGMON  3,162,952
ROTARY DIFFERENCE GAGE
Filed Aug. 30, 1962  3 Sheets-Sheet 1

INVENTOR.
Rudolph R. Hegmon
BY John W. Grines
ATTORNEY

Dec. 29, 1964  R. R. HEGMON  3,162,952
ROTARY DIFFERENCE GAGE
Filed Aug. 30, 1962  3 Sheets-Sheet 2
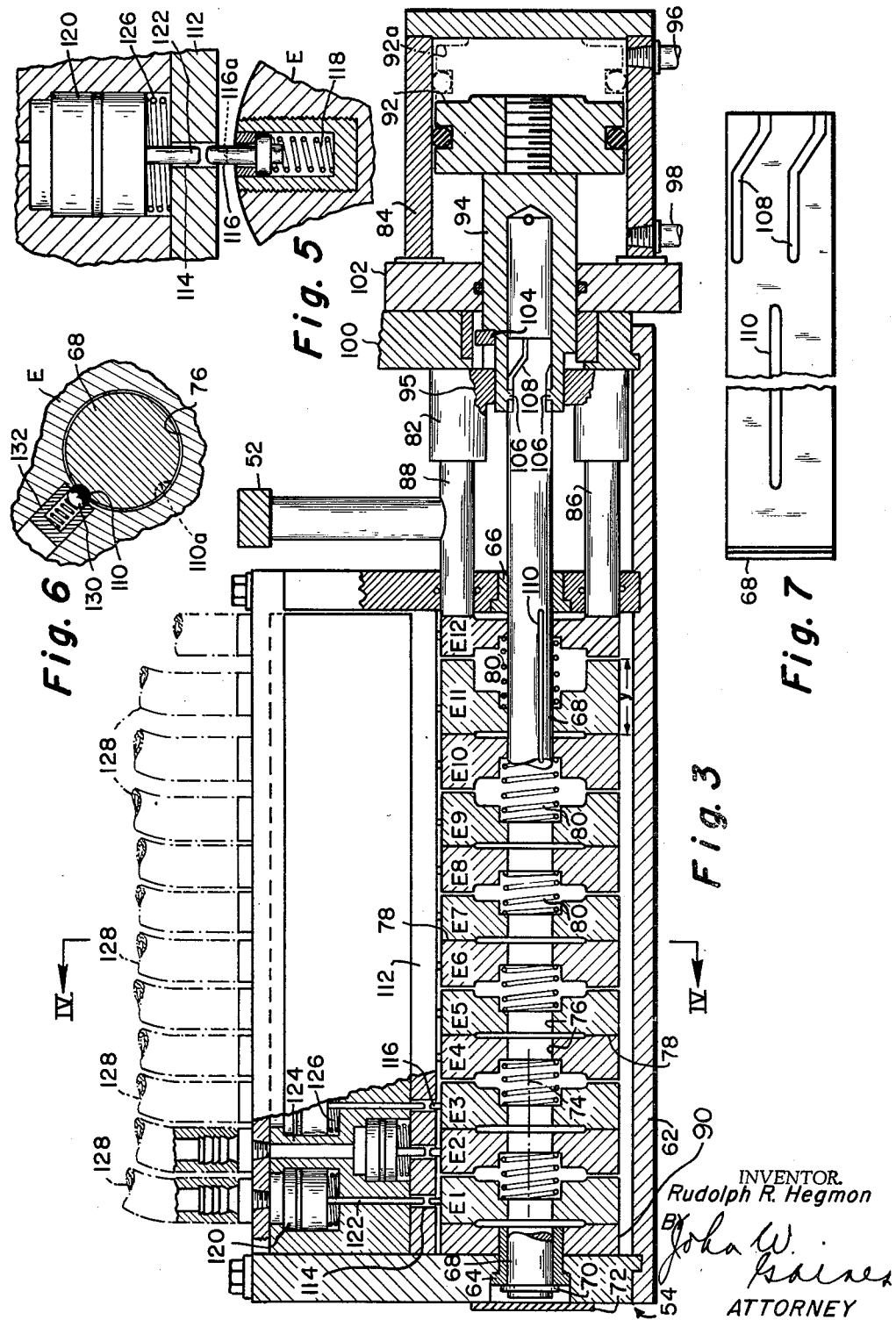
INVENTOR.
Rudolph R. Hegmon
BY John W. Gaines
ATTORNEY Dec. 29, 1964  R. R. HEGMON  3,162,952
ROTARY DIFFERENCE GAGE
Filed Aug. 30, 1962  3 Sheets-Sheet 3
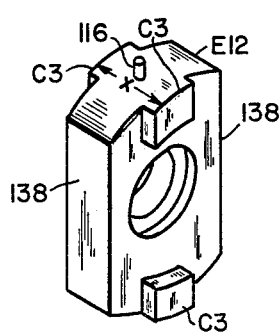
Fig. 11
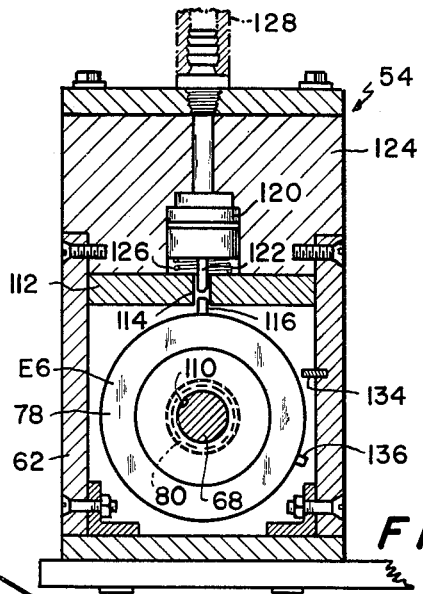
Fig. 4
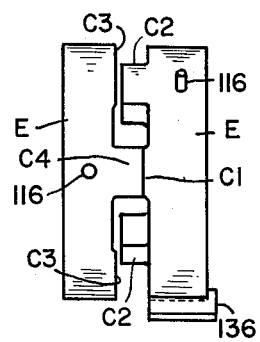
Fig. 10
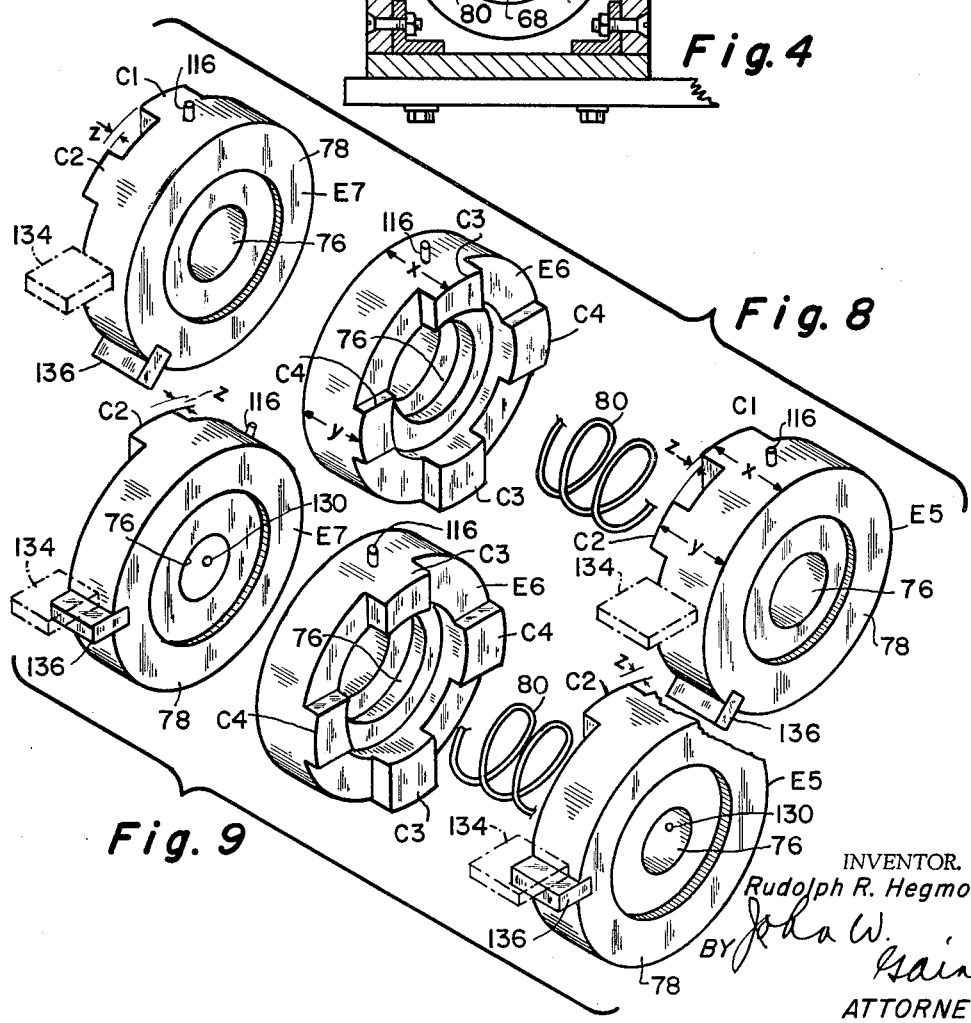
Fig. 8
Fig. 9
INVENTOR.
Rudolph R. Hegmon
BY John W. Gaines
ATTORNEY United States Patent Office 3,162,952
Patented Dec. 29, 1964

3,162,952
ROTARY DIFFERENCE GAGE
Rudolph R. Hegmon, State College, Pa., assignor to Centre Circuits, Inc., State College, Pa., a corporation of Pennsylvania
Filed Aug. 30, 1962, Ser. No. 220,404
14 Claims. (Cl. 33—125)

This invention relates to a rotary difference gage for accurately presetting the position of automatic table-stopping pawls, or other table or carriage-stopping mechanisms, and the like. The gage itself is automatic, presetting the location of the stopping device accurately to a thousandth part or to a ten thousandth part within some full unit of movement, such as one-half inch or a whole inch.

The tables and carriages primarily contemplated are of a type adapted to support a workpiece and having universal rectilinear movement along two coordinate axes. The instant gage forms part of the control apparatus for positioning the table by orderly establishment of a sequence of large and small increment settings which are of a cumulative effect, enabling the workpiece to be stopped at precisely the right decimal point or points for machining as desired. The stopping device senses the relative position of the table at the right time and stops it, always referenced with respect to the preset position of the stopping device and therefore directly dependent upon the accuracy to which the device has been pre-positioned by the gage.

Heretofore, gage rod mechanisms of the decade type have been proposed; the various parts provided and the machining of the ten-rod elements of each decade to an exact decimal length have created substantial expense. The present difference gage system affords the same or higher accuracy, using gage elements much shorter in length and fewer in number. More particularly, a binary code system is presently adapted to operate the elements so that the ten elements previously required for each decade are no longer necessary. Merely four elements per set, each having two points thereon with a predetermined length difference dimension, are adequate because in the instant improvement they can be used in many combinations. These lengths, measured at the two points, however, afford an exact decimal difference through a novel rotary disk construction and arrangement as will now be explained.

Various features, objects and advantages will be specifically pointed out or become apparent when, for a better understanding of the invention, reference is made to the following description, taken in conjunction with the accompanying drawings which form a part hereof and in which:

FIGURE 3 is a longitudinal sectional view of the gage taken along section lines III—III of FIGURE 2;

FIGURE 4 is a transverse sectional view taken along the lines IV—IV of FIGURE 3;

FIGURES 5 and 6 are detail views of portions of the structure of FIGURE 4 which are shown enlarged and broken away for clarity;

FIGURE 7 is the so-called envelope or developed view of the rotatable supporting shaft for the gage elements;

FIGURES 8 and 9 are exploded views of a number of the gage elements, in perspective, with the supporting shaft omitted;

FIGURE 10 is a top plan view, showing two elements after having taken a final relative position; and FIGURE 11 is a perspective view of the end element designated E12 in FIGURE 3.

Figure 1:
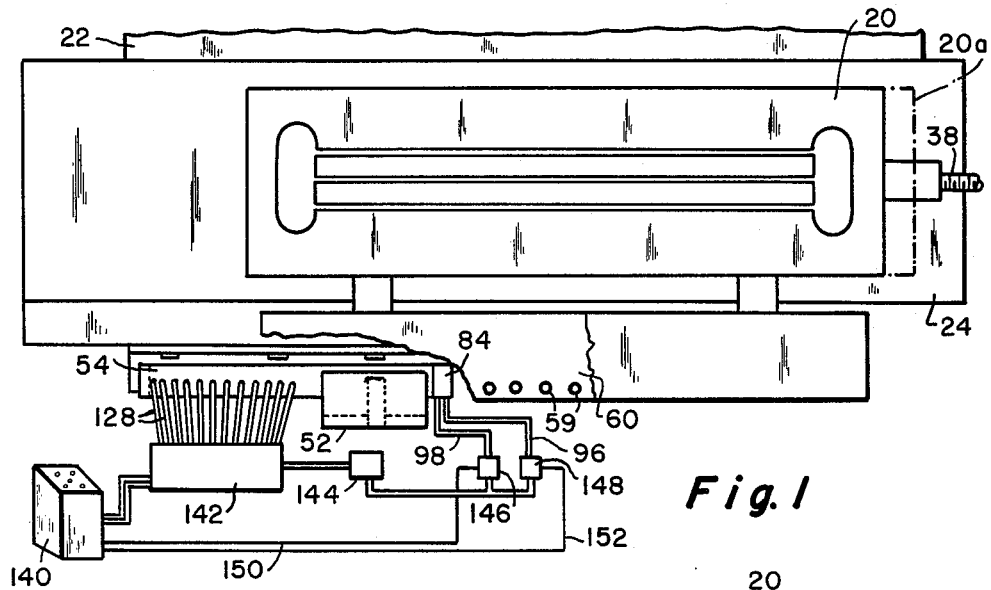
FIGURES 1 and 2 are top plan and side elevational views respectively of the work piece carrying portions of a machine tool embodying the present invention.

More particularly in FIGURES 1 and 2 of the drawings, the work-supporting portions of a machine tool include a longitudinally disposed table 20, a curved knee 22 below the table, and a saddle element 24 which supports the table 20 and which is supported by the knee 22. These elements are carried by the base 26 of a machine tool on which the knee 22 is adjusted up and down along a set of vertical ways 28. If the machine is a milling machine, for example, the work operation will be performed by a milling head, not shown.

As the saddle 24 moves into the dotted line position (FIGURE 2) shown by the dotted lines 24a with respect to the knee 22, it carries the table 20 (and the work piece) into the dotted line position shown by the dotted lines 20a. This movement is controlled by a dual motor drive 30 which turns a lead screw 32 connected to the saddle 24. A large increment motor 34 is coupled by an automatic clutch to one input shaft of the dual drive 30 and a small increment stepping motor 36 is coupled by an automatic clutch to the other input shaft of the drive 30.

The table 20 moves with respect to the saddle 24 from a dotted line zero reference position indicated by the dotted lines 20a of FIGURE 1 to various positions along an axis transverse to the saddle movement. Movement of the table is accomplished by a lead screw 38 which is operated by a dual motor drive similar to the drive 30 just discussed.

Figure 2:
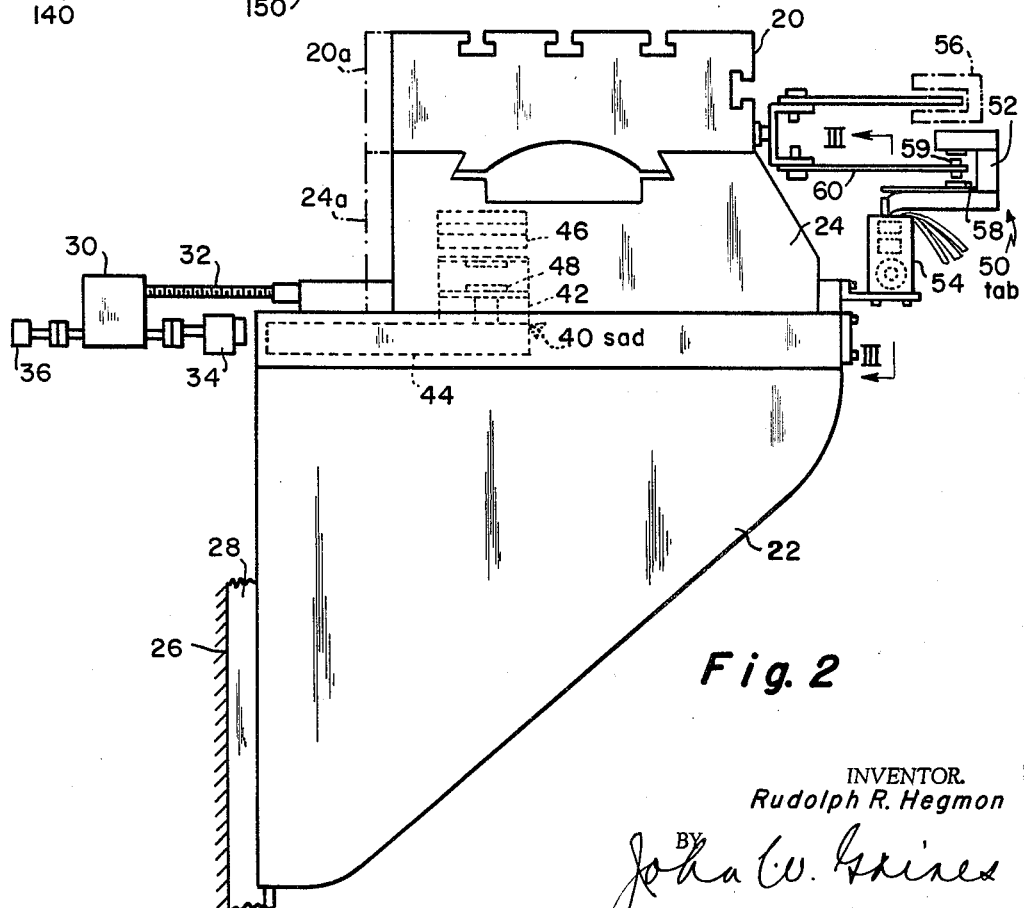

In FIGURE 2, a positioning control 40 sad. is connected to the large increment and small increment motors 34 and 36 to operate the lead screw 32; a positioning control 50 tab. operates the motors controlling the other lead screw 38. The control 50 tab. includes a table-stopping device 52 and a rotary difference gage 54 for presetting the position of the stopping device 52. They are supported by the saddle 24 independently of and in cooperative relationship with an automatic gage 56. In order to stop the table accurately, the stopping device 52 carries a sensor 58 which senses exact registry with the right inch element 59 or mark hereinafter described.

The positioning control 40 sad. includes a similar stopping device 42 for stopping the saddle 24. A rotary difference gage 44 supports the device 42 in cooperative relationship with respect to an automatic gage 46. Generally, the automatic gage 46 functions at the right time to discontinue the large increment motor 34 from driving the saddle 24 and to cause the stopping device 42 to bring the saddle to a controlled stop through controlled operation of the small increment motor 36. A sensor 48 on the stopping device 42 is connected to control this final movement and the instant of stopping of the small increment motor 36.

As seen in FIGURES 1 and 2, the inch marks or elements 59 referred to are arranged in series, being longitudinally spaced apart one inch center to center on a panel strip 60 carried by the table 20. The automatic gage 56 senses when the selected inch element 59, say the element at the eighth inch mark, arrives in the vicinity of the sensor 58. Then, as previously indicated concerning the sensor 48, the sensor 58 takes control and operates a small increment motor so as to stop the table at the point where the selected element 59 and the sensor are eactly indexed. This sequence is occurring, while a similar sequence is being followed by the positioning control 40 sad. in operating the motors 34 and 36 of FIGURE 2.

The difference gages 44 and 54 are the same and the description of gage 54 of FIGURE 3 and the following figures applies to both gages.

More particularly in the gage 54 of FIGURES 3 and 4, an elongated rectangular frame 62 of the gage carries spaced apart bearings 64 and 66 in which a grooved supporting shaft 68 is journaled, enabling the shaft to turn through its desired operative travel of a quarter revolution. A shaft snap ring 70 which engages the end of the bearing 64 and a cover plate 72 on the frame prevent the shaft from moving lengthwise of its axis 74. The supporting shaft 68 is received in the hubs 76 of a series of comparatively thin gage disks or elements E which are individually identified by different subscripts and which independently turn and slide by a limited amount with respect to the shaft 68. Each of the elements E has a smooth bearing face 78 at one side by which it engages a corresponding smooth face on an adjacent element E and it is urged into this engagement by means of a separating spring 80 at the other side which surrounds the shaft 68 and which biases apart the element from another element E at said other side.

Because these elements E are provided with at least two portions apiece which are of a different thickness as hereinafter described, selected portions of these elements can be vertically positioned and aligned due to the rotative position taken by each element, to aggregate an accurate thickness presetting the position of the stopping device 52. For this purpose a loading plate 82 operated by an air cylinder 84 carries a pair of vertically aligned rods 86 and 88 which are supported for longitudinal movement in the frame 62. The rod 88 carries the stopping device 52 and the rods 86 and 88 engage diametrically opposed, aligned portions of the elements E, forcing them into solid contact with one another and against an end plate stop 90 carried by the frame 62.

The cylinder 84 contains a slidably mounted piston 92 which extensively and retractively moves a hollow piston rod 94. During the terminal portion of each advancing stroke of the rod 94, a shoulder thereon engages a hub portion 95 of the clamping plate 82 to cause it to clamp the elements E. A line 96 supplies air to provide the extending movement and another line 98 supplies air to the cylinder for retractive movement of the piston rod 94. The piston rod 94 possesses another important function. It has a telescoped relation over the free end of the grooved shaft 68, being supported for axial movement in a bearing carried by a transverse plate 100 fixed in the frame 62. An end cover 102 closing the cylinder 84 is secured to the plate 100. A key 104 between the rod 94 and plate 100 prevents rotation of the rod 94.

Two lugs 106 fixed in the interior of the hollow piston rod 94 engage two part-helical grooves 108 formed in the end of the shaft 68 therein, the shaft and its grooves being shown in developed view in FIGURE 7. These helical grooves 108 produce one quarter of a turn of the shaft in one direction during extending movement of the piston rod 94 and the same amount of turn in the reverse direction during retractive movement; extending movement terminates when the rod 94 engages the loading plate 82, forcing the vertically aligned portions of all of the elements E into the forced solid contact described. The stopping device 52 occupies its gaged preset position at this point.

In FIGURES 3, 4 and 5, a horizontally disposed, longitudinal plate 112 in the frame 62 presents a row of individual locking openings 114, each being vertically aligned with one of the gage elements E. A plunger 116 carried by each element E engages its associated opening to prevent rotary movement of the element. A spring 118 (FIGURE 5) normally forces the plunger 116 outwardly. The force of the spring 118 can be overcome so that the plunger takes a position shown by dotted lines 116a where it is disengaged from the locking opening 114. This disengagement is caused whenever an air-actuated piston 120 moves a piston rod 122 downwardly in the locking opening 114 so as to force the plunger 116 to retract.

The piston 120 is part of a series of operating pistons, each afforded a proper length of stroke within an individual cylinder formed in a cylinder block 124. Each piston is controlled in the cylinder by a return spring 126 at the bottom and by air pressure which is introduced in the top of the cylinder through a tape-reader-operated inlet line 128. Thus the pistons 120 in the cylinders take either one of two possible positions, being down or up respectively, depending on whether the binary air signal is an on-signal or an off-signal supplied by the reader to that cylinder.

In FIGURES 3, 6 and 7, the length of the straight groove 110 in the supporting shaft 68 is sufficient to pass through the hubs 76 of each of the gage elements E. The groove 110 has a normal third quadrant position as shown by the solid lines in FIGURE 6 and, when the shaft 68 is rotated through the quarter turn described, the groove takes a fourth quadrant position shown by the dotted lines 110a as viewed in FIGURE 6. A ball detent 130 in the hub 76 of each element E is biased by a spring 132 so as to seat in the groove 110 whenever the shaft 68 is in its normal third quadrant position and when, at the same time, the plunger of the element E is engaged in the locking opening 114 thereabove.

When the shaft 68 rotates into the solid line position of FIGURE 3, every alternate one of the elements E which happens to be unlocked, namely any one of the elements E2, E4, E6, etc., rotates conjointly with the shaft 68 for a quarter revolution. Each remaining one of the elements E which is unlocked, namely the elements E1, E3, E5, etc., rotates only one-eighth of a turn and further motion is arrested, owing to a stop 134 (FIGURE 4) which is present for purposes hereinafter described.

After the stopping device 52 has performed an operation, the elements E are released and the pistons 120 and 92 and the shaft 68 are restored to their initial positions. Engagement of the ball detents 130 with the straight groove 110 in the grooved shaft 68 forms impositive connections and yet it insures that the shaft 68 will return the respective selected elements E through one-eighth or one-fourth of a turn, as appropriate, into their unrotated positions.

In FIGURE 8, a number of the elements E of one set is shown prior to being selectively rotated, namely gage elements E5, E6 and E7 by way of example. The element E5 has two diametrically opposed lugs of equal thickness and of which the lug C1 is shown. Another lug C2 is circumferentially aligned with the lug C1 in 45-degree spacing therefrom and the lug C2 is diametrically opposed to a like lug, not shown. The pair of lugs C1 are machined relative to the pair of lugs C2 so that the peripheral thickness dimension $x$ of the element E5 exceeds a thickness indicated at dimension $y$ thus producing a thickness difference $z$ which in one physically constructed embodiment of the invention was 0.010 inch. The element E5 is constrained so as to be rotated from locked position a maximum of one-eighth of a revolution with the shaft; a lug 136 carried by the element E5 engages the described stop 134 in the frame 62 at that point and, due to the impositiveness of a detent connection when resistance is encountered, detent 130 is depressed, releasing the shaft 68 to rotate independently.

The element E6 has a pair of equal diametrically opposed lugs C3 which project so as to provide a thickness dimension $x$ at the periphery. Another lug C4 and a diametrically opposed equal lug C4 are circumferentially aligned with the lugs C3 and provide a lesser thickness dimension indicated by the dimension $y$ appearing on the element E6. The dimension $x$ in one physically constructed embodiment of the invention was greater than the $y$ dimension by a difference of 0.020 inch.

In element E7, the thickness of each lug C1 exceeds the thickness of each adjacent lug C2 by the difference $z$ equalling 0.040 inch. The difference between the lugs of the last succeeding element E8 (not shown) of the set was 0.080 inch. In the locked position appearing in solid lines in FIGURE 8, all of the thicker lugs are aligned and the reading afforded by the particular elements E5, E6 and E7 shown is 0.010 plus 0.020 plus 0.040 equalling the 0.070 inch difference reading.

In FIGURE 9, the gage element E5 is shown after being operatively rotated with its lug C2 and the opposite lug C2 (not shown) in the vertical position. Thus this element affords a zero reading.

For the sake of contrast, the element E6 of FIGURE 9 is shown retained in the locked position, with its thicker lugs C3 and C3 in the vertical position thus affording the previous difference reading of 0.020 inch. It is apparent that if the plunger 116 had been disengaged from the locking hole, not shown, the element E6 would have rotated the entire quarter revolution with the shaft, not shown, in a clockwise direction as viewed in FIGURE 9 so as to bring the less thick lugs C4 and C4 into the vertical position. In that instance, the gage element E6 would have afforded a zero reading. Element E7 as shown in FIGURE 9 affords its zero reading.

In FIGURE 10, a top plan view appears illustrating the interdental fit between two consecutive elements E. It is seen that the element with the 45-degree lugs C1 and C2 is in the rotated position, whereas the element having the lugs C3 and C4 spaced apart at 90 degrees is locked with the lugs C4 in the vertical plane. Due to the angular difference in peripheral spacing of the lugs, the mutually offset lugs C2 and C3 illustrate how the unselected lugs do not interfere and the selected lugs C1 and C4 engage solidly together.

In FIGURE 11, the illustrated end gage element E12 in this specific example is required to produce a difference reading equal to 0.400 inch. The peripheral thickness at $x$ has this dimension, which is controlled by carefully machining the lengths of four symmetrically disposed lugs C3. In operation, when the plunger 116 is retained in its locking opening, the element E12 affords its difference reading of 0.400 inch; when the plunger 116 is disengaged so that opposed relieved portion 138 of the element E12 are rotated into the vertical position, the gage element E12 affords its zero reading.

It is apparent that with a proper selection of thickness differences, the elements E1–E12 of FIGURE 3 produce every decimal in 0.001 inch graduations through appropriate binary combinations. I have found one system satisfactory in which elements E in the first group of four elements are arranged with gage element E1 affording the difference 0.001 inch, E2 affording the difference 0.002 inch, E3 affording the difference 0.004 inch, and element E4 affording the difference 0.008 inch. The middle group, already considered by way of specific example, has the difference 0.010 inch afforded by element E5, 0.020 inch afforded by element E6, 0.040 inch afforded by the element E7, and 0.080 inch afforded by the element E8.

The last group, because the elements E are thicker, preferably conforms to a one-two-four-four proportion, wherein element E9 affords a difference reading of 0.100 inch, E10 affords a difference reading of 0.200 inch, element E11 affords a difference reading of 0.400 inch, and element E12 affords a difference reading of 0.400 inch. In the last instance, the figure 0.700 inch is achieved numerically on the basis of 1 plus 2 plus 4 equals 7; the figure 0.900 inch is achieved on the basis of 1 plus 4 plus 4 equals 9.

It is not essential, however, that the difference thicknesses of the elements constituting each group be limited to the 1-2-4-8 or the 1-2-4-4 proportions so far considered; the lug dimensions can conform to suitable other difference patterns which in proper combination equally well cover the decimal range.

The individual gage elements E are actually thin frustums of a cylinder, being formed in the rough as thin transverse sections of an alloy tool steel bar having a diameter, for instance, of one and one-eighth inches. In the particular embodiment herein illustrated, the thickest rotary gage element is element E11 and its thickest dimension, indicated by $y$ in FIGURE 3, was 0.870 inch, giving a thickness-to-diameter ratio of .77 to 1. It is significant that such elements having this relatively minor thickness dimension and smaller ones are controlled for the prescribed accuracy herein and at the same time produce an overall minimal length for the gage. The present rotary concept involving the paired difference lugs per element, the element-supporting shaft 68, and the plungers 116 for locking the elements accounts for these minimal size requirements and low thickness-to-diameter ratio.

It is appreciated that each element E of a four-unit set affords a difference between its zero position and its full difference position reading only to a common decimal place with respect to one another, but to a different decimal place from the elements E of the other sets; the elements of each set therefore combine independently in their operative relation and collectively enable the total number of sets of the elements E to aggregate a decimal figure reading to that number of decimal places.

It is further appreciated that only four control pistons 120 are required for each set of elements E and yet through selectable combinations in their actuation they produce a decade or more of settings. Actually, only ten of the permutations and combinations per set are required to provide each decimal place in a figure.

In FIGURE 1, a programming console which is indicated at 140 is provided to control the sequence of the machining operation cycles. Consequently the console 140 is provided with connections, not shown, by which it cyclically operates the milling head of the machine. The console 140 also activates at the proper time a tape reader which forms part of the binary-type numerical control system and which actually operates the positioning controls 40 sad. and 50 tab. of FIGURE 2.

The portion of the tape reader which is pertinent to the immediate disclosure hereof is indicated at 142 in FIGURE 1. Depending on the design selected it can read coded perforations off paper tape, cards, plastic tape and other pre-punched material. The reader 142 is connected by the input air lines 128 to the individual pistons 120 in the cylinder block 124 of each gage. The tape reader 142 is air operated from an air source 144 which also supplies air to a pair of solenoid valves 146 and 148. An electrical connection 150 between the console 140 and the solenoid of the valve 146 enables the valve 146 to selectively vent or to apply air pressure through piston-retracting line 98 leading to the front of the loading cylinder 84. An electrical connection 152 between the console 140 and the valve 148 enables the valve 148 selectively to vent the line 96 or to apply high-pressure air for loading movement of the cylinder 84 exerted against the loading plate 82 (FIGURE 3).

At the beginning of a sequence of operation of the system of FIGURE 1, the tape reader 142 is operated by the console 140 to advance to a new reading on conventional pre-perforated numerical control tape, for example, which is fed to the reader. In accordance with the binary code perforations, the reader 142 selectively supplies air into the appropriate lines 128 with which the perforations in the tape register, thus overcoming the springs 126 (FIGURE 3) in the lower ends of the selected cylinders and causing the pistons 120 and plungers 122 to extend. The plungers 116 of selected elements E are disengaged from their locking holes 114 in the gage 54.

The console 140 then operates the valve 148 into the open, pressure-loading position and the valve 146 is operated to vent the line 98. Pressure in the cylinder 84 operates the piston 92 and the shaft 68 causing the elements E, which have been selected, to be rotated whereupon all of the elements E are clamped to set the position of the stopping device 52 (FIGURE 3). At the same time, the rotary difference gage 44 of FIGURE 2 is similarly being set by the tape reader, thus presetting the stopping device 42 (FIGURE 2).

Simultaneously, other portions of the positioning controls 40 sad. and 50 tab. are being operated by the binary tape reader, and the table 20 is rapidly positioned along its two axes to the right point at which the stopping devices 42 and 52 automatically stop the table and the table is locked. A machining operation automatically takes place whereupon the tool head disengages from the work and is automatically re-set in an idle position.

The operation is then repeated.

As a numerical example, if it is desired to stop the table 20 when the table has advanced the work piece for machining at a point measuring 8.001 inches from a zero reference mark along the axis of the lead screw 38 of FIGURE 1, the gage elements of the gage 54 are operated such that only the element E1 affords its difference reading, namely 0.001 inch. The automatic gage 56 of FIGURE 2 monitors the table movement as the large increment motor and the lead screw 38 drive same and at the point where the element 59 at the 8-inch mark approaches registry with the sensor 58 of the stopping device 52, the automatic control 56 activates the sensor 58 of the stopping device 52. The sensor 58, which controls the small increment, stepping motor, senses exact registry with the element 59 located at the 8-inch mark and causes the motor to stop the table. The stopping point is consequently at the point 8.001 inches, representing the cumulative effect of the large increment of 8 inches, plus the additive small increment by which the device 52 has been preset exactly 0.001 inch from the zero reference point.

As herein disclosed, the invention embodies individual gage disk elements E which are shown to be locked in their neutral or difference position, thus affording their zero reading only after being moved into the operative or rotated position. It is evident that the gage can be built so that each gage element E is disposed to afford the zero reading when locked in the neutral or unrotated position, whereas it affords the difference reading in the operative or rotated position depending, of course, on the set-up selected for the type positioning system used and the particular on-off pneumatic binary signal arrangement from the tape reader in that system.

Variations within the spirit and scope of the invention described are equally comprehended by the foregoing description.

What is claimed is:

1. A difference gage for positioning an adjustable stopping device, comprising a stack of consecutive binary sets of rotary gage elements for connection to such stopping device in a series arrangement therewith, said elements comprising one-piece, thin disks having one thin peripheral portion and one thinner portion of which the difference is a predetermined small decimal fraction, and automatic means rotatably supporting and automatically operating the gage elements into relatively peripherally aligned positions of rotation to aggregate a gage reading of the desired magnitude in establishing the position of the adjustable stopping device, said disks each having an integral hub, the outside diameter of said disks being no more than approximately 1⅛" and the thickest portion of any disk being in a ratio of no more than approximately 0.77 to 1.00 relative to the diameter of that disk.

2. Difference gage for decimally positioning an adjustable stopping device, comprising a stack of coaxial sets of thin binary rotary gage elements, the elements of each set characterized by unrotated and rotated conditions in which they can be selectively aligned to present a different peripheral thickness of each element, between its unrotated and rotated positions, reading to a common decimal place, which decimal place however is a different decimal place from that given by the elements of the other sets, whereby the binary elements of each set combine so that they aggregate as only a portion of the total decimal reading and in terms of that decimal place, and means supporting and operating a number of sets of the gage elements in the operative arrangement described whereby their aligned portions aggregate a gage reading complete to that number of decimal places, said means comprising interengaged connections, which lock said elements fast to fixed means and selected ones of which are unlocked to release the associated elements to rotation, and a rotatable device having means providing separate simultaneous connections to all elements for rotating a plurality of the elements in unison, the last said connections being impositive rendering the rotatable device ineffective to rotate the other elements but effective to turn the selected elements in unison into their rotated position.

3. In combination, a difference gage for decimally positioning an adjustable device, comprising a number of consecutive rotary sets of binary signal-controlled gage elements each of flat, disk-like construction and arranged in series, the elements of each set characterized by an unrotated and rotated condition in which they can be selectively aligned to present a difference of peripheral thickness of each element, between its unrotated and rotated positions, reading to one common decimal place, which decimal place, however, falls at a different decimal place in a figure from the decimal place given by the elements of all other sets, whereby the binary signal-controlled elements of each set combine so that they aggregate as only a portion of a total figure and in terms of that one decimal place only, and means including signal-emitting binary tape reader mechanism connected to the gage operative to actuate the number of sets of gage elements in the arrangement described whereby, in response to the emitted binary signals of a tape reading, the aligned portions of the elements aggregate a corresponding gage reading complete to said number of decimal places, said means further including a rotatable device having means providing separate, simultaneous, impositive connections to all elements ineffective to rotate locked elements but effective for rotating selected ones of the elements in unison, and interengaged connections in the output of the binary tape reader mechanism, which interengaged connections lock together the gage elements and fixed means, and selected ones of which interengaged connections unlock the associated elements in response to said binary signals enabling selected gage elements to be rotated in unison by the rotatable device.

4. Gage means for adjusting the position of an adjustable device to accurate decimal points within a range of travel, the range of adjustment of said device being a major unit and each of said points being a decimal fraction of said unit complete to a desired number of decimal places, said gage means comprising a series of sets of binary rotary gage elements each having a hub and arranged in coaxial relation, the elements of each set characterized by an unrotated and a rotated position and yielding a difference of peripheral thickness presented between its unrotated and rotated positions, reading only to a common decimal place with respect to one another, but to a different decimal place from all elements of the other sets, whereby the binary elements of each set combine independently in their operative relation so that the total number of sets aggregate a decimal figure reading to that number of decimal places, and means comprising a surrounding fixed frame and common shaft means received in the hub of each of the elements and rotatably supporting and controlling them in the operative relationship described so that the elements aggregate with each setting a gage reading of the adjustable device complete to the number of decimal places desired, said common shaft having means providing separate simultaneous connections to all hubs for rotating a plurality of the elements in unison, said connections being impositive connections, there being interengaged connections, which lock together the fixed frame and each of the gage elements, and selected ones of which unlock the associated gage elements enabling selected gage elements of each set to be rotated in unison leaving the unselected elements of the set locked by said interengaged connections.

5. Gage means for adjusting the position of an adjustable device to accurate decimal points within a range of travel, the range of adjustment of said device being a major unit and each of said points being a decimal fraction of said unit, complete to a desired number of decimal places, said gage means comprising a series of sets of binary rotary gage elements, rotatable means supporting said elements each in axial alignment with the others, each element in a respective set having an unrotated and a rotated position and yielding a difference, presented by its peripheral thicknesses between the unrotated and rotated positions, reading only to a common decimal place with respect to one another, but to a different decimal place from all elements of the other sets, whereby the binary elements of each set combine independently in their operative relation so that the total number of sets aggregate a decimal figure reading to that number of decimal places, a fixed frame having interengaged means, between it and said elements locking said elements against rotation and actuable to unlock selected ones of said elements at a given time, said rotatable means having separate, simultaneous, impositive connections to all elements ineffective to rotate the locked elements but effective for rotating the selected ones of said elements in unison so as to present alignable portions affording a desired difference gage reading, and loading plate means for pressing together the elements with their aligned portions in engagement so as to aggregate, with each selected setting, a gage reading of the adjustable device complete to the number of decimal places desired.

6. Difference gage mechanism comprising a series of sets of binary rotary gage elements, the elements of each set characterized by being thicker in at least two circumferentially aligned portions of the periphery of the element than in its periphery in general, and further characterized whereby the thickness difference of said two portions of each element of the set differs from the thickness difference of two portions of the periphery of other elements of the set, a fixed stop device and an adjustable stopping device operatively related to the sets of gage elements so as to be held separated by and in engagement with their peripheries at the respective opposite ends of the series, first means supporting the elements and said devices in the operative relationship described so that the fixed stop device and intervening peripheries of the gage elements will establish a gage reading of the desired accuracy for the position of the adjustable stopping device, said first means comprising a rotatable device having means providing separate, simultaneous connections to all elements for rotating a plurality of the elements in unison, said connections being impositive connections, there being interengaged connections, which lock each of the elements and fixed means, and selected ones of which connections positively restrain the associated ones of the gage elements against rotation by the rotatable device, and means connected to the just said device to rotate it for selectively shifting the remaining gage elements so that one thicker portion of individual gage elements is moved into a point of a longitudinal alignment with said devices for aggregating in length with the other thicker portions the accurate gage reading desired.

7. In a difference gage of the rotary element type, a frame, means secured in said frame for rotatably supporting a series of binary, generally circular gage elements, said means comprising a shaft, a series of binary, generally circular gage elements provided with hubs receiving, and coaxially supporting said elements upon said shaft, the elements characterized by being thicker in at least two circumferentially aligned portions of the periphery of each element than in its periphery in general, and means for selectively rotating said elements to bring selected portions of their peripheries into alignment, alternate ones of said elements having their two circumferentially aligned portions spaced apart at one angle from one another, each remaining one of said elements having the two portions thereof spaced apart by a larger angle about their periphery so that when the selected portions are aligned the unselected portions of the respective elements will be offset from one another so as not to abut.

8. In a difference gage of the type having generally circular, binary rotary gage elements, a frame, means carried by the frame for rotatably supporting the elements comprising a shaft, and a series of generally circular binary rotary gage elements having hubs receiving the shaft and being coaxially supported thereupon, the elements characterized by carrying at least two circumferentially aligned axially projecting lugs on each element accurately formed to provide a thickness difference in the periphery at the points where the lugs are located, alternate ones of the elements in the series having the two lugs thereof spaced apart circumferentially at a predetermined angle of approximately ninety degrees, each remaining one of the elements having the lugs thereof spaced apart at an angle which is a submultiple of said predetermined angle, and means for selectively shifting the gage elements so that selected lugs align to aggregate in length with one another thereby producing an accurate gage reading as desired, the unselected lugs due to the difference in angularity between the lug location on successive elements being offset from one another so as not to interfere with the desired gage reading.

9. In a rotary difference gage, the combination of a frame, a series of rotary gage elements therein each having a hub, a majority of said elements having a peripheral portion provided on each element which differs by a decimal in thickness from another portion on that element, controlled means holding said elements against rotation, and controlling means for selectively turning said elements so as to rotate portions of the selected elements into precise alignment, said controlling means comprising rotatable shaft means in the frame and received in the hub of each element for supporting same and for turning the selected elements, clamping means shiftably mounted in said frame at a location operatively aligned with the periphery of all elements in said series, and motor means having a predetermined stroke of motion and establishing an operative connection with the shaft means and clamping means during one motion to rotate portions of the selected elements into alignment and to clamp respective aligned portions solidly together to establish a gaged setting.

10. The combination of claim 9, wherein said controlled means comprises plungers carried by the gage elements and normally engaged in fixed locking openings in the frame, said controlling means comprising piston and cylinder means in said frame individually responsive to on-off binary signals for selectively disengaging the plungers to unlock selected gage elements, and binary tape reader means having a fluid pressure output and having the individual piston and cylinder means connected in said output so as to provide effective on-off binary signals thereto read from an input tape.

11. The combination of claim 9, wherein said operative connection established by the motor means comprises a lug and a part-helical groove connected between the motor means and the shaft means, and a separable hub and shoulder connection connected between the motor means and the clamping means.

12. The combination of claim 9, wherein interposed means in said series of elements biases them apart by two's, in opposition to the clamping means, said interposed means providing intervening clearance space so that the portions of the elements clear one another, prior to clamping, without interfering with free rotation of the selected elements.

13. In a rotary difference gage, the combination of a frame, a series of rotary gage elements therein adapted to be clamped together, said elements being smooth on one side and carrying lugs on the opposite side, and arranged so as to face alternately to one another whereby the lug side of each element operatively confronts the lug side of an adjustment element, controlling means for selectively turning said elements so as to rotate lug portions of selected elements into precise alignment, said controlling means comprising a common shaft for supporting said elements and for turning the selected elements, and individual biasing means interposed in said series of elements at points so that, with respect to consecutive elements, the biasing means biases their lug sides apart and their smooth sides together.

14. The combination of claim 13, wherein said biasing means consists of coil springs between elements and disposed in surrounding relation to the common shaft.

References Cited by the Examiner

UNITED STATES PATENTS

| 2,580,255 | 12/51 | Summers | 33—125 |
| 2,932,088 | 4/60 | Knosp | 33—125 |

FOREIGN PATENTS

| 25,785 | 3/53 | Finland. |
| 546,157 | 6/42 | Great Britain. |

ISAAC LISANN, *Primary Examiner.*